(12) United States Patent
Jernström

(10) Patent No.: US 10,958,693 B2
(45) Date of Patent: Mar. 23, 2021

(54) METHODS AND APPARATUSES FOR ASSOCIATING USER IDENTIFICATION INFORMATION TO CHATBOT CAPABLE FRAMEWORKS

(71) Applicant: Telia Company AB, Solna (SE)

(72) Inventor: Maria Jernström, Vega (SE)

(73) Assignee: Telia Company AB, Solna (SE)

( * ) Notice: Subject to any disclaimer, the term of this patent is extended or adjusted under 35 U.S.C. 154(b) by 1 day.

(21) Appl. No.: 16/412,669

(22) Filed: May 15, 2019

(65) Prior Publication Data

US 2019/0356704 A1 Nov. 21, 2019

(30) Foreign Application Priority Data

May 16, 2018 (SE) .................................... 1850571-9

(51) Int. Cl.
*H04L 29/06* (2006.01)
*H04L 12/58* (2006.01)

(52) U.S. Cl.
CPC .......... *H04L 65/1073* (2013.01); *H04L 51/02* (2013.01); *H04L 65/1006* (2013.01); *H04L 65/1069* (2013.01)

(58) Field of Classification Search
CPC ..... H04L 51/02; H04L 51/04; H04L 65/1006; H04L 65/1069; H04L 65/1073; H04L 63/10; H04L 67/42; H04L 2463/082
See application file for complete search history.

(56) References Cited

U.S. PATENT DOCUMENTS

2016/0149839 A1\* 5/2016 Yi .................... H04L 67/1095
709/206
2017/0279745 A1\* 9/2017 Janajri .................. H04L 51/043
(Continued)

FOREIGN PATENT DOCUMENTS

| EP | 3211840 A1 \* | 8/2017 | ............. H04L 51/18 |
| EP | 3211840 A1 | 8/2017 | |
| WO | WO-2018214163 A1 \* | 11/2018 | ............. G06Q 50/01 |

OTHER PUBLICATIONS

Tom Van Pelt et al. "Rich Communication Suite 7.0, Advanced Communications, Services and Client Specification, Version 8.0", Jun. 28, 2017 (Jun. 28, 2017), pp. 1 -368, XP055484161, GSMA.\*
(Continued)

*Primary Examiner* — Michael C Lai
(74) *Attorney, Agent, or Firm* — Burr & Forman LLP; Jeffrey H. Kamenetsky (57) ABSTRACT

Embodiments herein relate to methods, a user equipment and a chatbot agent for associating/connection a user identification information to a chatbot capable framework user-specific identify. The method comprises: establishing a session with the chatbot agent over a chatbot capable framework, receiving a request to connect or associate the user identification information to the framework user-specific identity; providing the user identification information to the chatbot agent; receiving a message including information on the operator of the chatbot agent and further including the user identification information; and sending, to the chatbot agent, a confirmation message confirming that the user identification information be associated to the framework user-specific identity and further confirming that the user identification information be stored in a database of the operator.

16 Claims, 5 Drawing Sheets

(56) References Cited

U.S. PATENT DOCUMENTS

2018/0032576 A1* 2/2018 Romero ............ G06F 16/24522
2018/0205676 A1* 7/2018 Goyal ..................... H04W 4/08
2018/0219921 A1* 8/2018 Baer ................... H04L 65/1069
2018/0331980 A1* 11/2018 Jernstrom ............... H04L 51/04

OTHER PUBLICATIONS

Search Report, Application No. 1850571-9, dated Dec. 27, 2018, Swedish Patent and Registration Office, Stockholm, Sweden.
Fujii H., Tsuruoka Y. "Two-factor user authentication with SMS and voiceprint challenge response", 8th International Conference for Internet Technology and Secured Transactions, pp. 283-287. Published in Dec. 9, 2013. doi: 10.1109/ICITST.2013.6750207; abstract; Chapter III B, pp. 284-285.
Search Report, Application No. 19170848.6-1216, dated Aug. 7, 2019, European Patent Office, Munich, Germany.
Tom Van Pelt et al: Rich Communication Suite 7.0, Advanced Communications, Services and Client Specification, Version 8.0, Jun. 28, 2017, pp. 1-368, XP055484161, GSMA, retrieved from the Internet: URL:https://www.gsma.com/futurenetworks/rcs/rcs-documentation [retrieved on Jun. 13, 2018 *p. 168, paragraph 3.6 Chatbots—p. 191, paragraph 3.6.5.1.6.1 Processing Link Report Message *relevant to claims 1-20.
Haruhiko Fujii et al: International Journal for Information Security Research (IJISR), vol. 4, Issue 1, Mar. 2014, Two Factor User Authentication with SMS and Voiceprint Challenge Response, pp. 384-390, *relevant to claims 1-20.

* cited by examiner

METHODS AND APPARATUSES FOR ASSOCIATING USER IDENTIFICATION INFORMATION TO CHATBOT CAPABLE FRAMEWORKS

TECHNICAL FIELD

The present disclosure relates to the field of data communications, and in particular to a user equipment, a chatbot agent and methods for associating user identification information to a chatbot capable framework user-specific identity.

BACKGROUND

Chatbots are becoming increasingly popular as an interactive medium for the provision of information. A chatbot is a computer or software agent designed to have conversations with human correspondents. A chatbot is also called an "internet bot", a "web robot", a "www robot" or simply a "bot", a virtual assistant, a virtual client, an automated agent, etc. The computer agent or bot, by means of a processor, includes an application that runs automated tasks (e.g., scripts) over one or several platforms. In a simple example, a chatbot performs tasks that are both simple and have structurally repetitive, at a higher rate that would be possible for a human being alone. Chatbots for different chat applications can be developed using a chatbot framework. The bot logic is created once and then deployed to the chatbot platform of choice. A chat platform API (Application Programming Interface) may vary in functionality available for the chatbot framework and the bot needs to be designed for the chat platform.

With today's technologies, a user may have access to chat platforms and associated chatbots from a plurality of devices, such as a laptop, a PC, a mobile device, etc.

RCS (Rich Communication Suite) offers a delivery channel for rich messages towards end users from other end users but also offer A2P (Application to Person messaging) from companies to communicate with their customers. A telecom operator may use the MSISDN (Mobile Subscriber ISDN Number) to route RCS messages towards the end user device.

Companies may build A2P messaging agents on a variety of different chatbot frameworks, where RCS is one framework; others are Google Actions and Amazon Web Services. An automated agent or a chatbot can be deployed in several of these frameworks with the same business logic to run the conversations with the end user. Today a user can find these agents on smart speakers or in their smart assistants in their mobile phones such as Google assistant, or in the RCS message flow or on Facebook messenger, Kik, Slack and Skype, etc.

An end user could use different identities for communicating on these different frameworks and yet another identity (MSISDN) is used by the telecom operator to communicate with its customers through RCS or SMS messaging.

Today, known solutions require the end user to download an application (app.) for a specific chatbot capable framework to associate user identities to a chatbot. This is troublesome for a telecom operator desiring to deploy/offer services to its customers through an automated agent on chatbot capable frameworks other than the one the operator is using. In addition, the chatbot capable framework provider needs to add features in the app. to connect the operator.

SUMMARY

It is an object of the embodiments herein to solve the above problems by providing a method performed by a user equipment, a user equipment, a method performed by a chatbot agent and a chatbot agent for connecting or associating a user identification information to a chatbot capable framework user-specific identify.

According to an aspect of embodiments herein, there is provided a method performed by a user equipment, the method comprising: establishing a session with a chatbot agent over a chatbot capable framework; receiving, from the chatbot agent, a request to connect or associate a user identification information to a chatbot capable framework use-specific identity; providing the user identification information to the chatbot agent; receiving, from the chatbot agent, a message including information on the operator of the chatbot agent and also including the user identification information. The method further comprises, sending, to the chatbot agent, a confirmation message confirming that the user identification information be connected or be associated to the chatbot capable framework user-specific identity and further confirming that said user identification information be stored in a database of the operator of the chatbot agent.

According to an aspect of embodiments herein, there is provided a user equipment configured to: establish a session with a chatbot agent over a chatbot capable framework; receive, from the chatbot agent, a request to connect or associate a user identification information to a chatbot capable framework user-specific identity; provide the user identification information to the chatbot agent; receive, from the chatbot agent, a message including: information on the operator of the chatbot agent and further including the user identification information; send, to the chatbot agent, a confirmation message confirming that the user identification information be connected or be associated to the chatbot capable framework user-specific identity, and further confirming that said user identification information be stored in a database of the operator of the chatbot agent.

According to another aspect of embodiments herein, there is provided a method performed by a chatbot agent, the method comprising: establishing a session with a user equipment over a chatbot capable framework; transmitting, to the user equipment, a request to connect or associate a user identification information to a chatbot capable framework user-specific identity; receiving, from the user equipment, the user identification information; transmitting, to the user equipment, a message including: information on the operator of the chatbot agent and further including the user identification information; receiving, from the User Equipment (UE), a confirmation message confirming that the user identification information be connected or be associated to the chatbot capable framework user-specific identity, and further confirming that said user identification information be stored in a database of the operator of the chatbot agent.

According to another aspect of embodiments herein, there is provided chatbot agent configured to: establish a session with a user equipment over a chatbot capable framework; transmit, to the user equipment, a request to connect or associate a user identification information to a chatbot capable framework user-specific identity; receive, from the user equipment, the user identification information; transmit, to the user equipment, a message including: information on the operator of the chatbot agent and further including the user identification information; receive, from the user equipment, a confirmation message confirming that the user identification information be connected or be associated to the chatbot capable framework user-specific identity, and further confirming that said user identification information be stored in a database of the operator of the chatbot agent.

An advantage with embodiments herein is that a user does not need to download and install any specific chatbot framework application. The user only needs to start a conversation with the chatbot agent of the operator through any preferred framework.

Another advantage with embodiments herein is that the operator of the chatbot agent may easily deploy its services through the chatbot agent over any user-preferred chatbot capable framework(s).

Additional advantages achieved by the embodiments herein will become apparent from the following detailed description when considered in conjunction with the accompanying drawings.

BRIEF DESCRIPTION OF THE DRAWINGS

Example of embodiments herein are described in more detail with reference to the attached drawings in which.

DETAILED DESCRIPTION

In the following, a detailed description of the exemplary embodiments is presented in conjunction with the drawings to enable easier understanding of the solutions(s) described herein.

Figure 1:
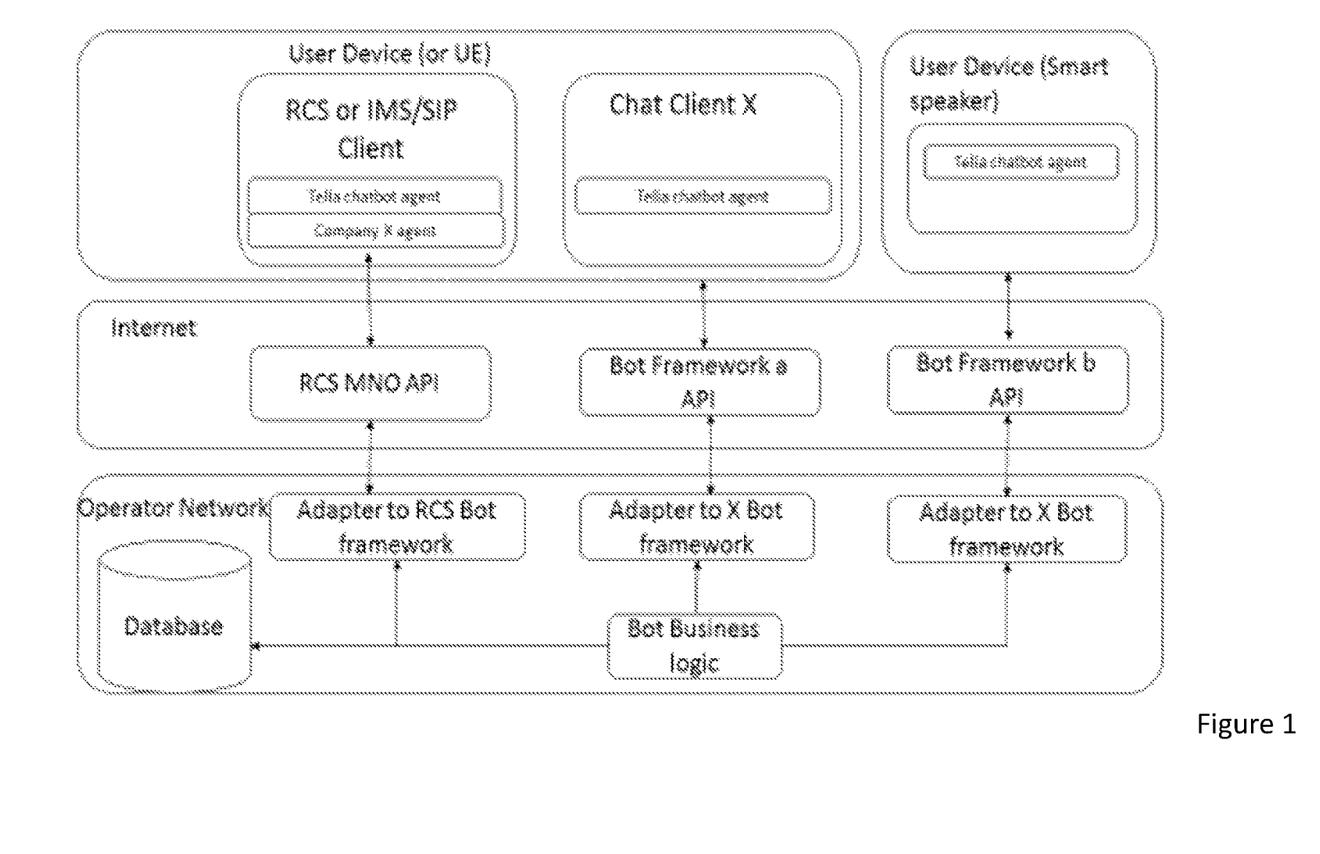
FIG. 1 illustrates a schematic overview of system components or architecture wherein some embodiments herein may be employed.

Referring to FIG. 1, there is illustrated an overview of system components in accordance with some embodiments herein. As shown, a user device or UE is provided with a client application which may be used to start a conversation with an assistant agent. The user device may connect to the mobile operator network with the capability of sending and receiving messages RCS and/or SMS messages. The user device is provided with a chat client application that may use RCS or IMS/SIP or HTTP protocols. Any suitable client protocol may also be used. In FIG. 1, a chat client X is shown which may be used by the user device to send/receive messages over chatbot (or bot) capable framework(s). Chat client X is shown provided with a chatbot agent belonging to the network operator (here denoted Telia).

A user may find a company chatbot platform by browsing a chatbot catalogue or, as in this case, start a conversation with an assistant agent of a company that helps the user to opt-in to A2P messaging. This can be useful when a user does not known which company can deliver a product the user is interested in. The user of the UE may access the assistant bot through different means: a contact in the RCS or IMS/SIP or HTTP client; by opening a menu in a downloaded plug-in for the RCS or IMS/SIP client; by accessing another suitable client application, or by accessing a web-interface. The user, by means of the UE, may enter user preferences which are then sent towards an application server (AS) via a network of an operator. The network may be an IMS-based network. It should mentioned that RCS is implemented on top of the IMS which is the underlying platform. A chat platform API (Application Programming Interface) may vary in functionality available for the chatbot framework and the bot needs to be designed for the chat platform.

In general, a bot (or chatbot) logic is hosted by a "bot framework" that has so called "web hooks" on an API for supported chat platform(s). In general, a web hook allows the bot framework to interact with the user and also be able to use third party sources to utilize NLP (Natural Language Processing) platforms to add intelligence to the bot communication logic.

FIG. 1 also depicts a user device (e.g., a smart speaker) with the capability for the user to interact with chat agents using NLP. An example of a smart speaker is the Google Home. The speaker enable users to speak voice commands to interact with services through Google's intelligent personal assistant called Google Assistant. A large number of services, both in-house and third-party, are integrated, allowing users to listen to music, control playback of videos or photos, or receive news updates entirely by voice. Google Home devices also have integrated support for home automation letting users control smart home appliances with their voice. Other examples of smart speakers include Amazon Echo or Apple HomePod.

FIG. 1 also shows a RCS Mobile Network Operator (MNO) API which is the framework used by the operator to send out RCS messages to users. If a UE does not support RCS, a SMS message can be sent instead. Bot framework APIs may be used by the automated agent business logic to read the end user on chatbot framework channels. Also shown are adapters to the different bit frameworks having the function to adapt the conversation features to what is available to the particular framework. As an example, some frameworks only support text-to-speech, while others support sending/receiving rich media such as videos, images, carousels of images, smart reply buttons, etc.

A database is also shown interfacing with the adapter to RCS bot framework and the bot business logic. The database may be used to store end user connections/associations between the different chatbot capable framework user-specific identities and the user identification information (e.g., MSISDN or SIP-alias, etc.) as will be explained in more detail below.

The chatbot capable framework user-specific identity may be a unique username alias over the particular chatbot capable framework. A username is alternatively referred to as an account name, login ID or user ID.

Figure 2:
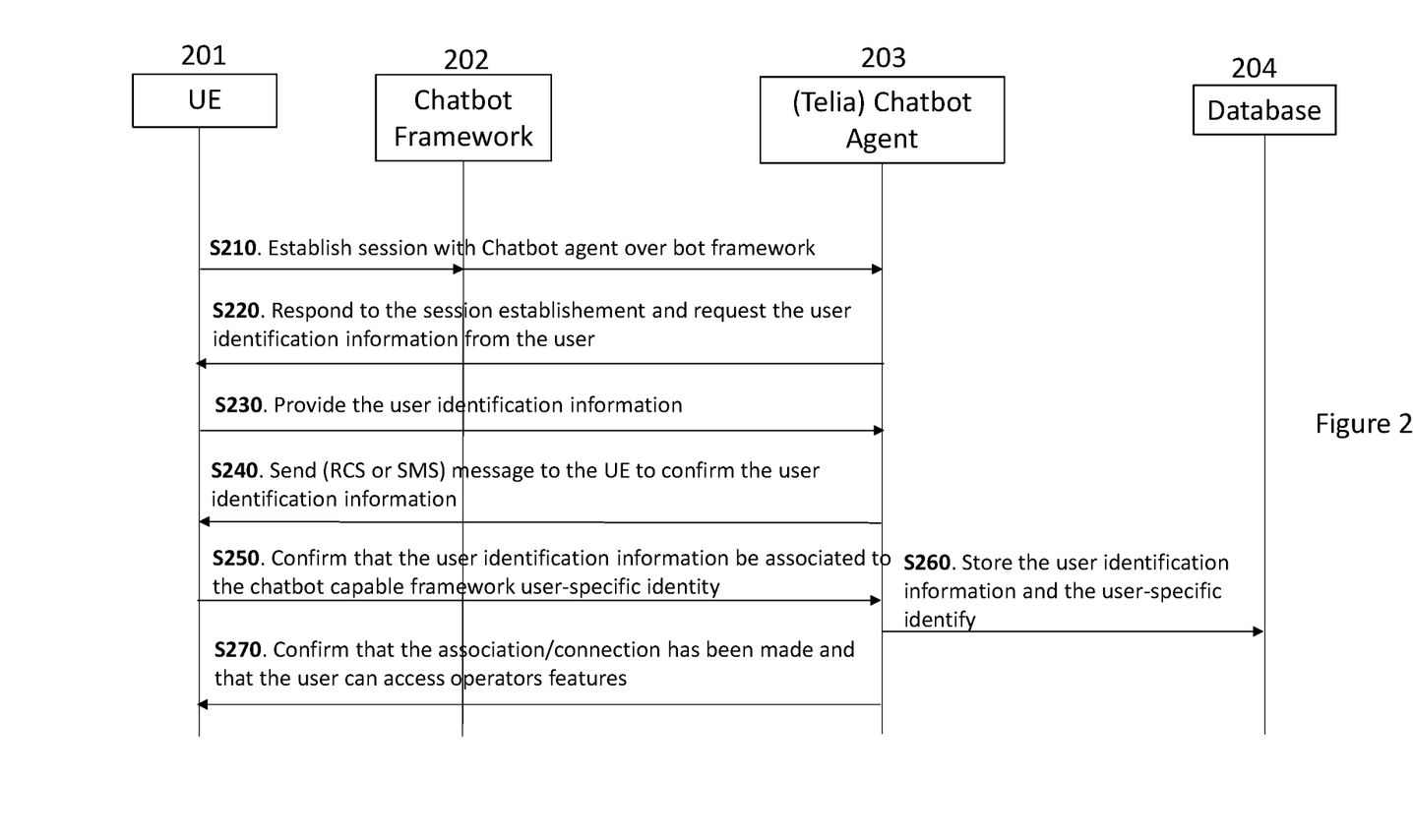
FIG. 2 illustrates an example scenario according to an embodiment herein.

Referring to FIG. 2 there is illustrated a flow diagram depicting connecting/associating user identification information to a chatbot capable framework user-specific identity according to some exemplary embodiments herein.

FIG. 2 illustrates an example of a UE 201 provided with a chatbot agent or chatbot client application for communicating with the chatbot agent of the network operator 203. Communication is performed over a chatbot capable framework 202 (e.g., Google Home or any suitable smart speaker). A database 204 is also depicted.

The actions performed include:

(S210) the user of UE 201 establishes a session with the (Telia) chatbot agent 203 over the chatbot capable framework 202. The user may find the chatbot agent 203 by searching a chatbot directory on the Internet, calling the chatbot agent name, typing the chatbot agent name, click on a link or scan a QR code.

(S220) The chat bot agent 203, by means of the bot backend (not shown), responds to the session establishment and asks if the user wishes to connect or to associate his/her user identification information (e.g., MSISDN or SIP-alias or E-164 number) to a chatbot capable framework user-specific identity. The chatbot agent 203 asks or requests the user to provide it with the user identification information. As an example, if the user, named Sally, has as chatbot framework Google Home, the user-specific identity may be sally@google.com.

This chatbot capable framework user-specific identity is a unique username alias over the particular chatbot capable framework (i.e., Google Home).

The chatbot agent 203 thus requests user Sally whether she wishes to connect or associate her identification number (MSISDN or SIP-alias or E-164 number) to sally@google.com. The user (Sally) provides the agent with the MSISDN or E-164 number or SIP-alias.

(S230) The user of UE 201 provides the requested identification information to the chatbot agent 203. This may be performed by inputting the MSISDN, SIP-alias or E-164 number (e.g., 00 46 8 123456) or by speaking it and in this case the speech-to-text API will transcribe to text that is then sent to the chatbot agent 203 or the bot backend logic (not shown).

(S240) The chatbot agent 203 (or the bot backed logic) of the operator then sends a confirmation message (RCS or SMS) to the UE 201 depending on the capability support in UE 201. This confirmation message includes the user identification number and information on the operator of the chatbot agent 203, in this example Telia assistant. As an example, if the user is a Telia subscriber and Telia sends a RCS message to the user, it will show up in the user's contact list as a message received from a verified sender, in this case Telia assistant. This way, the user of UE 201 can make sure that the sender is in fact from the user's telephone operator (Telia) by clicking on the contact details and see a verified sender symbol, contact information to the company, website, phone number, company logo and/or company color coder.

(S250) The user of UE 201 sends to the chatbot agent a confirmation message confirming that the user identification information be connected or be associated to the chatbot capable framework user-specific identity.

(S260) The user may also send back a text message "OK" or similar wording confirming that the user wishes to make the association/connection and to store said association/connection in the database 204. The user identification information and the user-specific identity for this chatbot capable framework are stored in the database 204.

(S270) When the connection/association is made, the chatbot agent 203 may confirm to the user of UE 201 over the established session that the connection/association has been made and that the user can start accessing his/her operator features available over the chatbot agent of operator assistant.

According to an embodiment, the user of UE 201 may repeat at least the above steps (S210)-(S250) to connect or associate the same user identification information to one or more additional chatbot capable framework user-specific identity(ies) associated with one or more additional chatbot capable framework(s) (e.g., Apple HomePod). The chatbot capable framework user-specific identity will be a unique username alias over the Apple HomePad. The new association/connection are then stored in the database. If the user wishes to remove an association or a connection between the, e.g., the MSISDN number the alias (e.g., sally@google.com), the user may request the chatbot agent to remove the association/connection.

Below is an example of how some embodiments herein may be employed. Assume that user Sally has a Google Home and her telecom operator is Telia. Telia has a Telia chatbot agent or assistant. Also, the user identification information is assumed to be the mobile telephone number of Sally 00 46 7123456.

Sally: "OK Google", "let me talk to Telia"

Google Home: "OK, connecting to Telia"

Telia agent/assistant: "Hi, I am Telia agent, I can help you to connect your mobile telephone number to this device (or to sally@google.com), do you want me to do that?"

Sally: "yes, connect the mobile number (0046 7123456) to sally@google.com"

Telia agent/assistant: "OK, please confirm the mobile number by responding to the message (SMS or RCS) I just sent you".

Telia agent/assistant: "Do you allow me to store the connection and your mobile number?"

Sally: "yes, do that"

Sally may now access or may make use of the features offered by Telia, like making outbound calls from the Google Home or purchase more data or change call settings etc.

If Sally has yet another device (e.g., Apple HomePod"), the same procedure as above can be used to connect the mobile phone number to the new device (or to Sally's Apple ID)

Assuming now that Sally wishes to remove association/connection:

Sally: "OK Google", "let me talk to Telia"

Google Home: "OK, connecting to Telia"

Telia agent/assistant: "Hi, I am Telia agent, how can I help you?

Sally: "remove the connection between my phone number 0046 7123456 and this device (or my alias sally@google.com)"

Telia agent/assistant: "OK, connection removed"

Thus, a user can start the conversation through the Telia agent on framework A and make the connection and the next time the user starts a new session with Telia chatbot agent through framework B, etc. The operator Telia of the chatbot agent may easily deploy its services through the chatbot agent over any user-preferred chatbot capable framework(s).

Also, the user is not required to download an application for the specific framework to make the connection between the user identification information (e.g., MSISDN) and the chatbot capable user-specific identity. The user only needs to start a conversation with the chatbot agent of the operator through any preferred chatbot capable framework.

For some services where sensitive user information might be exchanged over the chatbot agent interface, the confirmation from the end user needs to verify not only that this is one of potentially many devices connected to this number but in fact that the user accepting the connection between the identities is the end user that the message was intended for. In that case, the user can input a password or a pin-code or the SIM-card pin code that the operator can connect to this user-specific identity (e.g. MSISDN number). For even stronger authentication, a Bank-id application may be used to verify the user. As an example, in case a user provides, by mistake, the wrong mobile number to the chatbot agent and the agent sends the RCS or SMS message to the "wrong" user requesting confirmation of the connection/association, the "wrong" user cannot confirm the connection/association by simply sending a confirmation message since this "wrong" user does not have the correct pin-code. A timer can be set at the chatbot agent. If the user does not confirm the association/connection before the time expires, the chatbot agent may reply through the chatbot framework, that no confirmation has been received, and requests the user to provide the (correct) mobile phone number. A timer may also be set at the UE so that if no message is received from the chatbot agent before the timer expires, the user of the UE may again provide the (correct) mobile phone number and await for a message from the chatbot agent.

Figure 3:
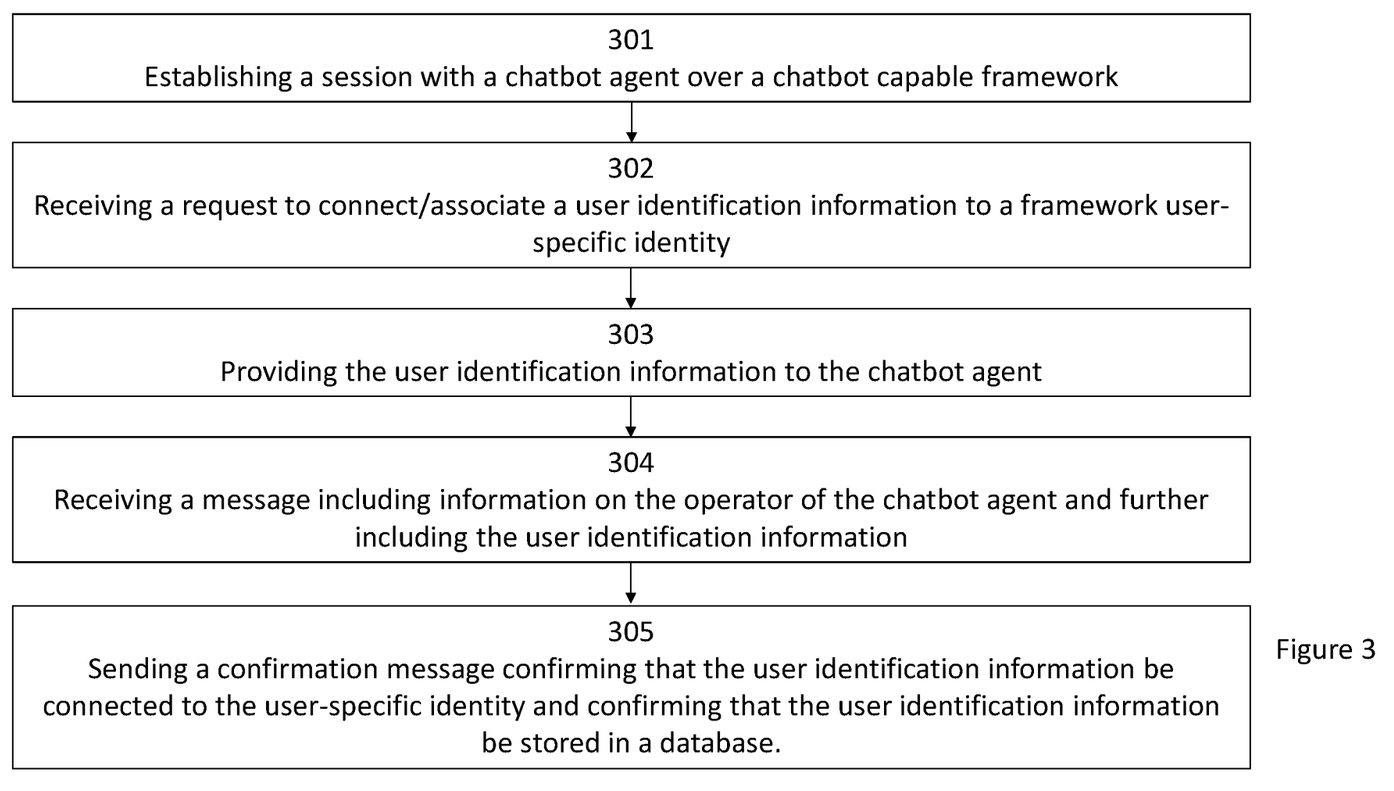
FIG. 3 illustrates a flowchart of a method in a UE according to an embodiment herein.

Referring to FIG. 3 there is illustrated a flowchart of a method performed by the UE 201 according to previously described embodiments. The main steps of the method comprise:

(301) Establishing a session with a chatbot agent over a chatbot capable framework;

(302) Receiving, from the chatbot agent, a request to connect or associate a user identification information to a chatbot capable framework user-specific identity;

(303) Providing the user identification information to the chatbot agent;

(304) Receiving, from the chatbot agent, a message including: information on the operator of the chatbot agent and further including the user identification information; and (305) Sending, to the chatbot agent, a confirmation message confirming that the user identification information be connected or be associated to the chatbot capable framework user-specific identity, and further confirming that said user identification information be stored in a database of the operator of the chatbot agent.

Additional embodiments have already been described and need not be repeated.

Figure 4:
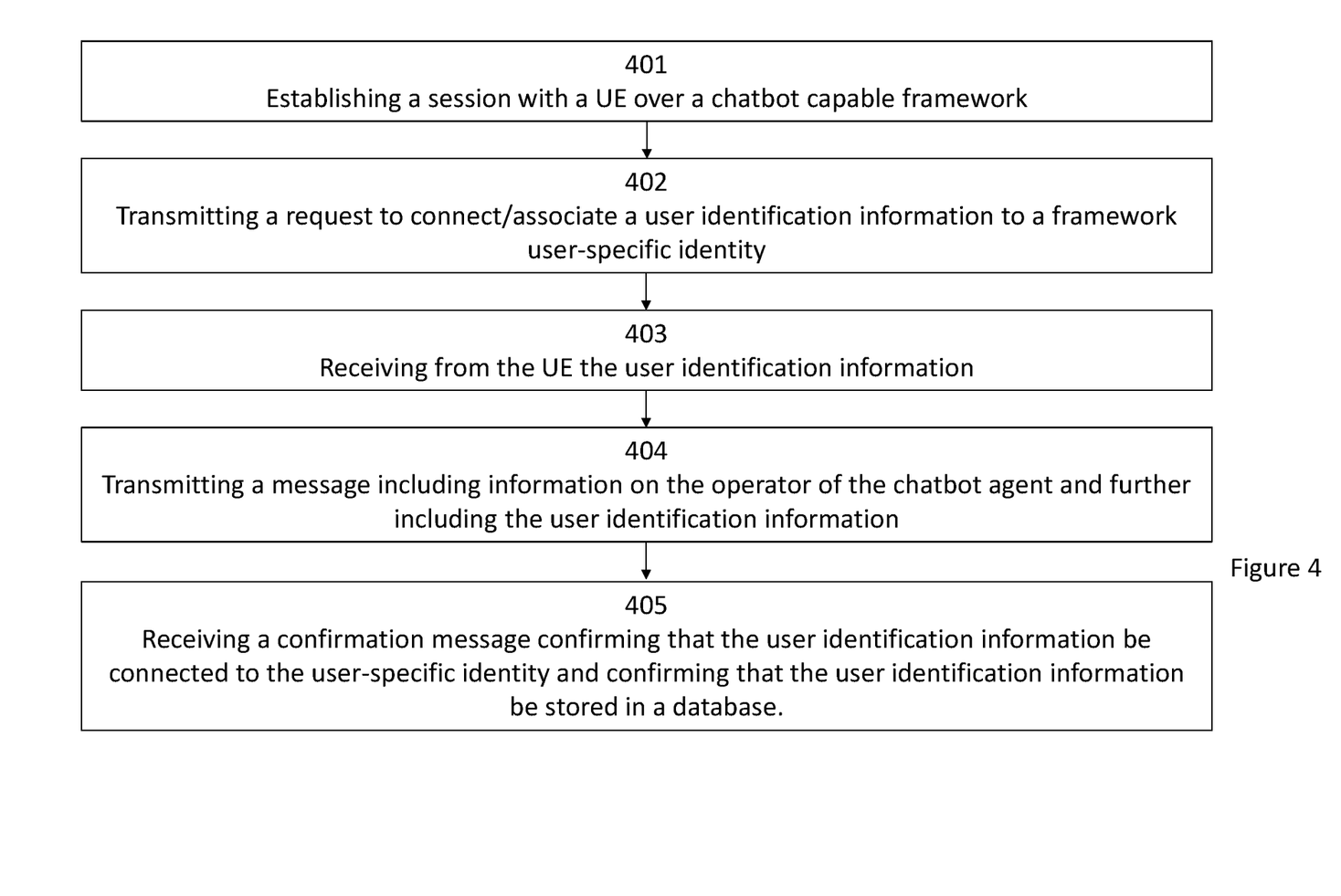
FIG. 4 illustrates a flowchart of a method performed by a chatbot agent according to an embodiment herein.

There is also provided a user device or UE 201 for performing the method steps described. The user device comprises a processor and a memory, said memory containing instructions executable by the processor wherein the user device is operative to or is configured to: (1) establish a session with a chatbot agent 203 over a chatbot capable framework 202; (2) receive, from the chatbot agent 203, a request to connect or associate a user identification information to a chatbot capable framework user-specific identity; (3) provide the user identification information to the chatbot agent 203; (4) receive, from the chatbot agent 203, a message including: information on the operator of the chatbot agent 203 and further including the user identification information; (5) send, to the chatbot agent 203, a confirmation message confirming that the user identification information be connected or be associated to the chatbot capable framework user-specific identity, and further confirming that said user identification information be stored in a database 204 of the operator of the chatbot agent 203. According to an embodiment, the UE 201 is configured to repeat steps (1)-(5), described above, for connecting or associating the same user identification information to another chatbot capable framework user-specific identity associated with another chatbot capable framework Referring to FIG. 4 there is illustrated a flowchart of a method performed by the chatbot agent 203 according to previously described embodiments. The main steps of the method comprise:

(401) Establishing a session with a UE 201, over a chatbot capable framework;

(402) Transmitting, to the UE, a request to connect or associate a user identification information to a chatbot capable framework user-specific identity;

(403) Receiving, from the UE, the user identification information;

(404) Transmitting, to the UE, a message including: information on the operator of the chatbot agent and further including the user identification information; and (405) receiving, from the UE, a confirmation message confirming that the user identification information be connected or be associated to the chatbot capable framework user-specific identity, and further confirming that said user identification information be stored in a database of the operator of the chatbot agent.

There is also provided a chatbot agent 203 that can be controlled by a processor or an application server or servers of the telecom operator, the chatbot agent being configured to: (1) establish a session with a user equipment over a chatbot capable framework; (2) transmit, to the user equipment, a request to connect or associate a user identification information to a chatbot capable framework user-specific identity; (3) receive, from the user equipment, the user identification information; (4) transmit, to the user equipment, a message including: information on the operator of the chatbot agent and further including the user identification information; (5) receive, from the user equipment, a confirmation message confirming that the user identification information be connected or be associated to the chatbot capable framework user-specific identity, and further confirming that said user identification information be stored in a database of the operator of the chatbot agent. According to an embodiment, the chatbot agent is configured to repeat steps (1)-(5) for connecting or associating the same user identification information to another chatbot capable framework user-specific identity associated with another chatbot capable framework.

Figure 5:
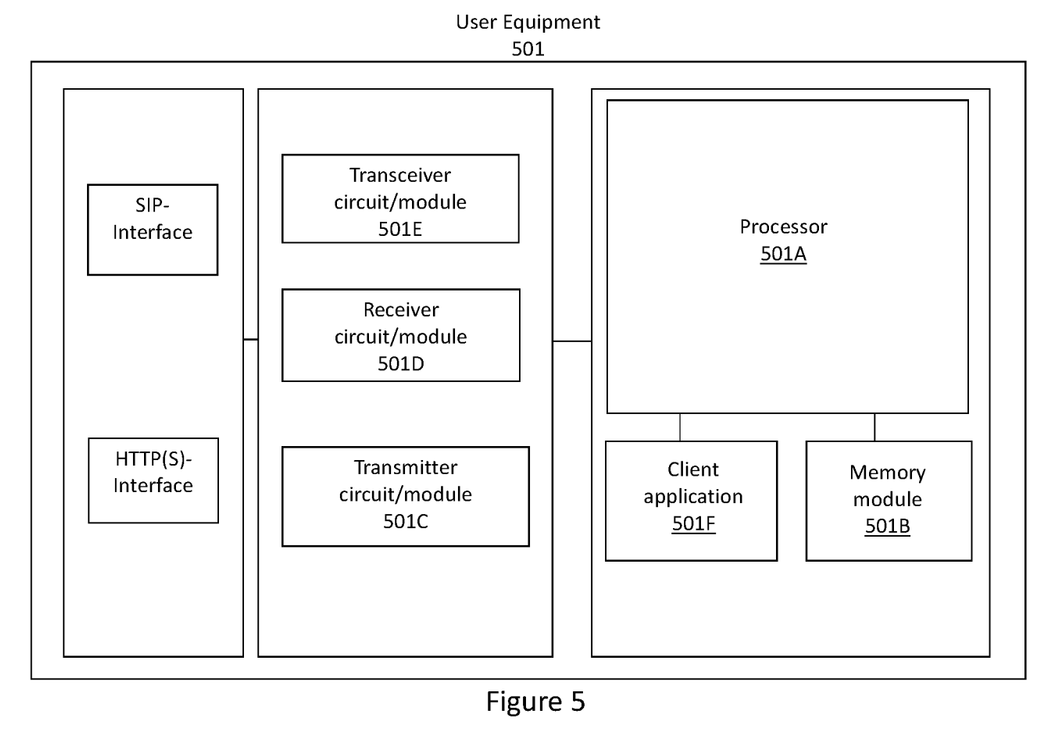
FIG. 5 illustrates a block diagram of a UE according to an embodiment herein.

In order to perform the method steps or actions described earlier, there is provided a UE 501 as shown in FIG. 5. UE 501 comprises a processing circuit or a processing module or a processor 501A; a memory module 501B; a transmitter circuit or transmitter module 501C; a receiver circuit or receiver module 501D; and a transceiver circuit or transceiver module 501E which may include the transmitter circuit 501C and the receiver circuit 501D. The UE 501 is also provided with suitable interface(s), a SIP interface and a HTTP(S) interface. The UE 501, for example, a mobile phone, a cell phone, a smart phone, a tablet, a PDA, etc. may support any of radio access technologies including 2G, 3G, 4G, 5G, Wifi, Wimax or a combination thereof. The UE 501 is provided with a suitable client, e.g., RCS client, IMS/SIP client 501F, etc., as previously discussed. The UE 501 may include a camera, an audio codec coupled to a speaker, a microphone, and an earphone jack. The UE 501 also includes a display controller (e.g., a touchscreen controller) which provides a graphical output to a display and in input from a touch input device. Collectively, the display device and touch input device may be referred to as touchscreen. The UE 501 is capable in communicating wirelessly to the Internet via WiFi or any wireless access technology mentioned above. The UE 501 may include additional component, entities, means or devices not shown in FIG. 5.

The processing module/circuit 501A includes a processor, microprocessor, an application specific integrated circuit (ASIC), field programmable gate array (FPGA), or the like, and may be referred to as the "processor 501A." The processor 501A controls the operation of the UE 501 and its components. Memory (circuit or module) 501B includes a random access memory (RAM), a read only memory (ROM), and/or another type of memory to store data and instructions that may be used by processor 501A.

The processor 501A is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 501A to carry out the operations of the UE 501 disclosed herein.

The memory 501B contains instructions executable by the processor wherein the UE 501 is operative to or is configured to establish a session with a chatbot agent over a chatbot capable framework; receive, from the chatbot agent, a request to connect or associate a user identification information to a chatbot capable framework user-specific identity; provide the user identification information to the chatbot agent; receive, from the chatbot agent, a message, the message including information on an operator of the chatbot agent and further including the user identification information; and send, to the chatbot agent a confirmation message confirming that the user identification information be connected or be associated to the chatbot capable framework user-specific identity, and further confirming that said user identification information be stored in a database of the operator of the chatbot agent. The UE 501 is further configured to connect or associate the same user identification information to another chatbot capable framework user-specific identity associated with another chatbot capable framework. The UE 501 is further configured to receive, from the chatbot agent, a confirmation that a user of the UE 501 can start accessing operator features available over the chatbot agent. In one embodiment, the user identification information is a Mobile Subscriber International Subscriber Directory Number, MSISDN, or a Session Initiation Protocol, SIP, alias of the user, and the message received from the chatbot agent is a RCS message or a SMS message. In another embodiment, the chatbot capable framework user-specific identity is a unique username alias over the particular chatbot capable framework. Additional details regarding the actions that may be performed by the UE 501 have already been described.

The described embodiments of the present invention can be realized in hardware, software, or a combination of hardware and software. A system can be realized in a centralized fashion in one computer system, or in a distributed fashion where different elements are spread across several interconnected computer systems. Any kind of computer system or other apparatus adapted for carrying out the methods described herein is suited. For example the chatbot agent may be controlled by a processor of a computer system of an application server. The computer program when being loaded and executed by the processor carries out the method described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 3G, 4G, 5G, WiMax etc.

Abbreviations

A2P Application To Person communication
API Application Programmable Interface
Agent A conversational entity that interacts with users by sending messages and reacting to users' responses.
MSISDN Mobile Subscriber ISDN Number
RCS Rich Communication Suite (GSMA)
SIP-alias Session Initiation protocol Public Identity

The invention claimed is:

1. A method performed by a User Equipment, UE, the method comprising:
    establishing a session with a chatbot agent over a chatbot capable framework;
    receiving, from the chatbot agent, a request to connect or associate user identification information to a chatbot capable framework user-specific identity, the chatbot capable framework user-specific identity being a unique username alias over the chatbot capable framework;
    providing the user identification information to the chatbot agent;
    receiving, from the chatbot agent, a message, the message including information on an operator of the chatbot agent and further including the user identification information;
    sending, to the chatbot agent, a confirmation message confirming that the user identification information be connected or be associated to the chatbot capable framework user-specific identity by responding to the request message from the chatbot agent to connect or associate the user identification information to the chatbot capable framework user-specific identity;
    receiving a request from the chatbot agent to confirm storage of said connection or association of the user identification information and the chatbot capable framework user-specific identity; and
    confirming to the chatbot agent that said user identification information be stored in a database of the operator of the chatbot agent.

2. The method according to claim 1, further comprising connecting or associating the same user identification information to another chatbot capable framework user-specific identity associated with another chatbot capable framework.

3. The method according to claim 1, further comprising receiving, from the chatbot agent, a confirmation that a user of the UE can start accessing operator features available over the chatbot agent.

4. The method according to claim 1, wherein the user identification information is a Mobile Subscriber International Subscriber Directory Number, MSISDN, or a Session Initiation Protocol, SIP, alias of the user, and wherein the message received from the chatbot agent is a Rich Communication Suite, RCS, message or a Short Message Service, SMS, message.

5. A User Equipment, UE, the UE including a processor and a memory, the memory containing instructions executable by the processor such that the UE is configured to:

establish a session with a chatbot agent over a chatbot capable framework;

receive, from the chatbot agent, a request to connect or associate user identification information to a chatbot capable framework user-specific identity, the chatbot capable framework user-specific identity being a unique username alias over the chatbot capable framework;

provide the user identification information to the chatbot agent;

receive, from the chatbot agent, a message, the message including information on an operator of the chatbot agent and further including the user identification information;

send, to the chatbot agent a confirmation message confirming that the user identification information be connected or be associated to the chatbot capable framework user-specific identity by responding to the request message from the chatbot agent to connect or associate the user identification information to the chatbot capable framework user-specific identity;

receive a request from the chatbot agent to confirm storage of said connection or association of the user identification information and the chatbot capable framework user-specific identity; and confirm to the chatbot agent that said user identification information be stored in a database of the operator of the chatbot agent.

6. The UE according to claim 5, further configured to connect or associate the same user identification information to another chatbot capable framework user-specific identity associated with another chatbot capable framework.

7. The UE according to claim 5, further configured to receive, from the chatbot agent, a confirmation that a user of the UE can start accessing operator features available over the chatbot agent.

8. The UE according to claim 5, wherein the user identification information is a Mobile Subscriber International Subscriber Directory Number, MSISDN, or a Session Initiation Protocol, SIP, alias of the user, and wherein the message received from the chatbot agent is a Rich Communication Suite, RCS, message or a Short Message Service, SMS, message.

9. A method performed by a chatbot agent, the method comprising:

establishing a session with a User Equipment, UE, over a chatbot capable framework;

transmitting, to the UE, a request to connect or associate user identification information to a chatbot capable framework user-specific identity, the chatbot capable framework user-specific identity being a unique username alias over the chatbot capable framework;

receiving, from the UE, the user identification information;

transmitting, to the UE, a message, the message including information on an operator of the chatbot agent and further including the user identification information;

receiving, from the UE, a confirmation message confirming that the user identification information be connected or be associated to the chatbot capable framework user-specific identity, the confirmation message responding to the request message from the chatbot agent to connect or associate the user identification information to the chatbot capable framework user-specific identity;

sending a request to the UE to confirm storage of said connection or association of the user identification information and the chatbot capable framework user-specific identity; and confirming that said user identification information be stored in a database of the operator of the chatbot agent.

10. The method according to claim 9, further comprising connecting or associating the same user identification information to another chatbot capable framework user-specific identity associated with another chatbot capable framework.

11. The method according to claim 9, further comprising transmitting, to the UE, a confirmation that the user of the UE can start accessing operator features available over the chatbot agent.

12. The method according to claim 9, wherein the user identification information is a Mobile Subscriber International Subscriber Directory Number, MSISDN, or a Session Initiation Protocol, SIP, alias of the user.

13. A chatbot agent, the chatbot agent including a processor and a memory, the memory containing instructions executable by the processor such that the chatbot agent is configured to:

establish a session with a User Equipment, UE, over a chatbot capable framework;

transmit, to the UE, a request to connect or associate user identification information to a chatbot capable framework user-specific identity, the chatbot capable framework user-specific identity being a unique username alias over the chatbot capable framework;

receive, from the UE, the user identification information;

transmit, to the UE, a message, the message including information on an operator of the chatbot agent and further including the user identification information;

receive, from the UE, a confirmation message confirming that the user identification information be connected or be associated to the chatbot capable framework user-specific identity, the confirmation message responding to the request message from the chatbot agent to connect or associate the user identification information to the chatbot capable framework user-specific identity;

send a request to the UE to confirm storage of said connection or association of the user identification information and the chatbot capable framework user-specific identity; and confirm that said user identification information be stored in a database of the operator of the chatbot agent.

14. The chatbot agent according to claim 13, further configured to connect or associate the same user identification information to another chatbot capable framework user-specific identity associated with another chatbot capable framework.

15. The chatbot agent according to claim 13, further configured to transmit, to the UE, a confirmation that the user of the UE can start accessing operator features available over the chatbot agent.

16. The chatbot agent according to claim 13, wherein the user identification information is a Mobile Subscriber International Subscriber Directory Number, MSISDN, or a Session Initiation Protocol, SIP, alias of the user.

* * * * *